United States Patent [19]
Day

[11] Patent Number: 5,655,167
[45] Date of Patent: Aug. 5, 1997

[54] THREE DIMENSIONAL CAMERA

[75] Inventor: Maureen Meredith Day, Encinitas, Calif.

[73] Assignee: Angraphie Dimensional Systems LLC, Encinitas, Calif.

[21] Appl. No.: 619,190

[22] Filed: Mar. 21, 1996

[51] Int. Cl.$^6$ ................................................ G03B 35/02
[52] U.S. Cl. .......................... 396/330; 396/329; 396/502
[58] Field of Search ................................. 396/324, 329, 396/330, 327, 326, 502, 503, 504

[56] References Cited

U.S. PATENT DOCUMENTS

| | | | |
|---|---|---|---|
| 3,503,316 | 3/1970 | Takano et al. | 396/330 |
| 4,109,262 | 8/1978 | Law | 396/330 |
| 4,222,645 | 9/1980 | Imura et al. | 396/502 |
| 4,304,477 | 12/1981 | Green | 396/330 |

Primary Examiner—A. A. Mathews
Attorney, Agent, or Firm—John L. Rogitz

[57] ABSTRACT

A 3-D camera includes a film carrier which in turn includes a frame, a film holder, and a lenticular lens carrier juxtaposed with a film holder and movable within the frame. Four springs are disposed between the frame and the lens carrier to urge against the lens carrier and thereby spring-load the lens carrier. Also, two opposed paddles are pivotably coupled to the frame opposite the springs. The paddles abut the lens carrier, such that when the paddles are moved the lenticular lens is moved relative to the film holder. A drive bolt is threadably engaged with the frame, and the drive bolt abuts the paddles. The bolt is operated by a motor for turning the drive bolt to thereby release the paddles and cause the lens holder to move. Additionally, the motor turns a shutter flywheel which is coupled to the shutter of the camera to open and close the shutter in coordination with the motion of the lenticular lens. A portable embodiment of the camera is also disclosed.

47 Claims, 5 Drawing Sheets

THREE DIMENSIONAL CAMERA

FIELD OF THE INVENTION

The present invention relates generally to three dimensional and animated (3-D) imaging, and more particularly to 3-D cameras that are easy to use.

BACKGROUND

Camera systems have been introduced for making so-called "three-dimensional" or "3-D" photographs which give the impression of animation or depth. In other words, a 3-D photograph can give a visual impression of an object that seems to move (an effect referred to as animation) as the viewing angle of the photograph is changed. Further, a 3-D photograph, although on a two-dimensional substrate, can give a visual impression of depth when viewed (an effect referred to as dimensions).

In either case, the effect of a 3-D photograph is achieved by directing light through a lenticular lens and against photographic film to expose the film in a particular, controlled way. More specifically, the shutter of a camera is opened, and light is directed through the shutter and camera lens and then through a lenticular lens, as the light propagates toward the film. During the period the shutter is open to expose the film, the camera can be moved along a predetermined track. The combination of movement and lenticular lens creates a photograph which, when overlaid with a lenticular viewing window and viewed at various angles, gives the visual impression of animation (if the subject of the photograph was moving) and/or depth.

It is to be appreciated that precise control of the motion of the camera and of the operation of the film and camera lenses is required to create effective 3-D photographs. It happens, however, that past systems have either failed to reliably control the camera of the system, consequently rendering substandard photographs, and have required excessive time and painstaking attention to detail in controlling the camera to create even a single 3-D photograph. Further, once prior 3-D systems have been adjusted and a photograph taken, repeated photographs require a virtually complete readjustment of the system.

Thus, in the past 3-D photographs required a trained professional photographer and an excessive period of time to create, and despite the best efforts of the photographer, frequently turned out badly. As a consequence of the relatively high cost and uncertain quality, the use of 3-D photographs has been limited. As recognized by the present invention, however, it is possible to provide a system for quickly, efficiently, and reliably creating 3-D photographs.

Accordingly, it is an object of the present invention to provide a system and method for creating 3-D photographs which does not require excessive adjustment of the system. Another object of the present invention is to provide a system and method for creating 3-D photographs which reliably generates quality 3-D photographs with comparative repeatability. Yet another object of the present invention is to provide a system and method for creating 3-D photographs which is easy to use and cost-effective.

SUMMARY OF THE INVENTION

A film carrier is disclosed for a camera having a lens. The film carrier of the present invention includes a frame and a film holder coupled to the frame for juxtaposing film with the lens. Further, the film carrier includes a lenticular lens that is juxtaposed with the film holder between the film holder and the lens of the camera. A spring-loaded lens carrier is stationarily coupled to the lenticular lens and is movably coupled to the frame to selectively move the lenticular lens relative to the film holder.

In a preferred embodiment, at least one spring is disposed between the frame and the lens carrier to urge against the lens carrier and thereby spring-load the lens carrier. Moreover, at least one paddle is pivotably coupled to the frame opposite the spring. In accordance with the present invention, the paddle includes a contact surface for abutting the lens carrier. Consequently, when the paddle is moved the spring urges the lens carrier to move, thereby moving the lenticular lens relative to the film holder.

Advantageously, a drive bolt is threadably engaged with the frame in an abutting relationship with the paddle. The drive bolt is preferably is spring biased to a neutral position. Also, a motor is coupled to the drive bolt for turning the drive bolt to thereby cause the lens holder to move. Additionally, a foam rubber pad which is characterized by a relatively high coefficient of friction is attached to the film holder for contacting the film and inhibiting relative motion therebetween.

In the particularly preferred embodiment, a plurality of coil springs is provided, and two paddles are provided, with the drive bolt abutting the second paddle. The contact surface of each paddle is defined by a respective contact element, and each contact element is movably engaged with the respective paddle for adjustment thereof relative to the respective paddle.

Desirably, a shutter flywheel is also coupled to the motor. A drive shaft couples the shutter flywheel to the drive bolt. The shutter flywheel further includes a shutter open trigger for opening a shutter of the camera and a shutter close trigger for closing the shutter.

In an alternate embodiment, the film holder is slidably engaged with the frame, such that the film holder can be manually advanced into juxtaposition with the lens carrier and such that the film holder can be manually retracted from the frame. More specifically, in this alternate embodiment a dark slide is slidably engaged with the frame, and a support plate that is formed with opposed bevelled ends is urged toward the dark slide by a plurality of coil plate springs. Consequently, the dark slide can be retracted from the frame to cause the plate springs to move the film holder into juxtaposition with the lens carrier.

In yet another alternate embodiment, a portable 3-D camera includes a housing, a camera lens positioned on the housing, and a lenticular lens positioned on the housing. An aperture is disposed between the lenses and is translationally movable in the housing.

In another aspect, a film carrier for a 3-D camera system having a camera includes a shutter flywheel. The flywheel in turn includes a shutter open trigger for opening a shutter of the camera and a shutter close trigger for closing the shutter. A motor is coupled to the shutter flywheel for turning the shutter flywheel to open and close the shutter.

In still another aspect, a 3-D camera includes a camera lens and a film holder positioned behind the camera lens. A lenticular lens is positioned between the camera lens and the film holder for translational movement of the lenticular lens relative to the film holder.

In yet another aspect, a 3-D camera system includes a camera. Also, the system includes a motor-driven shutter flywheel. A shutter open trigger is positioned on the flywheel for opening a shutter of the camera. Additionally, a shutter close trigger is positioned on the flywheel for closing the shutter. In accordance with the present invention, the shutter flywheel defines a diameter of at least eight inches (8").

In another aspect of the present invention, a photographic method is disclosed which includes positioning a lenticular lens between a camera lens and a camera film. The method also includes spring biasing the lenticular lens toward an end position, and holding the lenticular lens in a start position. Moreover, the method includes releasing the lenticular lens to permit the lens to move at a predetermined speed relative to the film.

In yet another aspect, a photographic method includes positioning a movable aperture between a camera lens and a lenticular lens, and then moving the aperture relative to the lenses.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
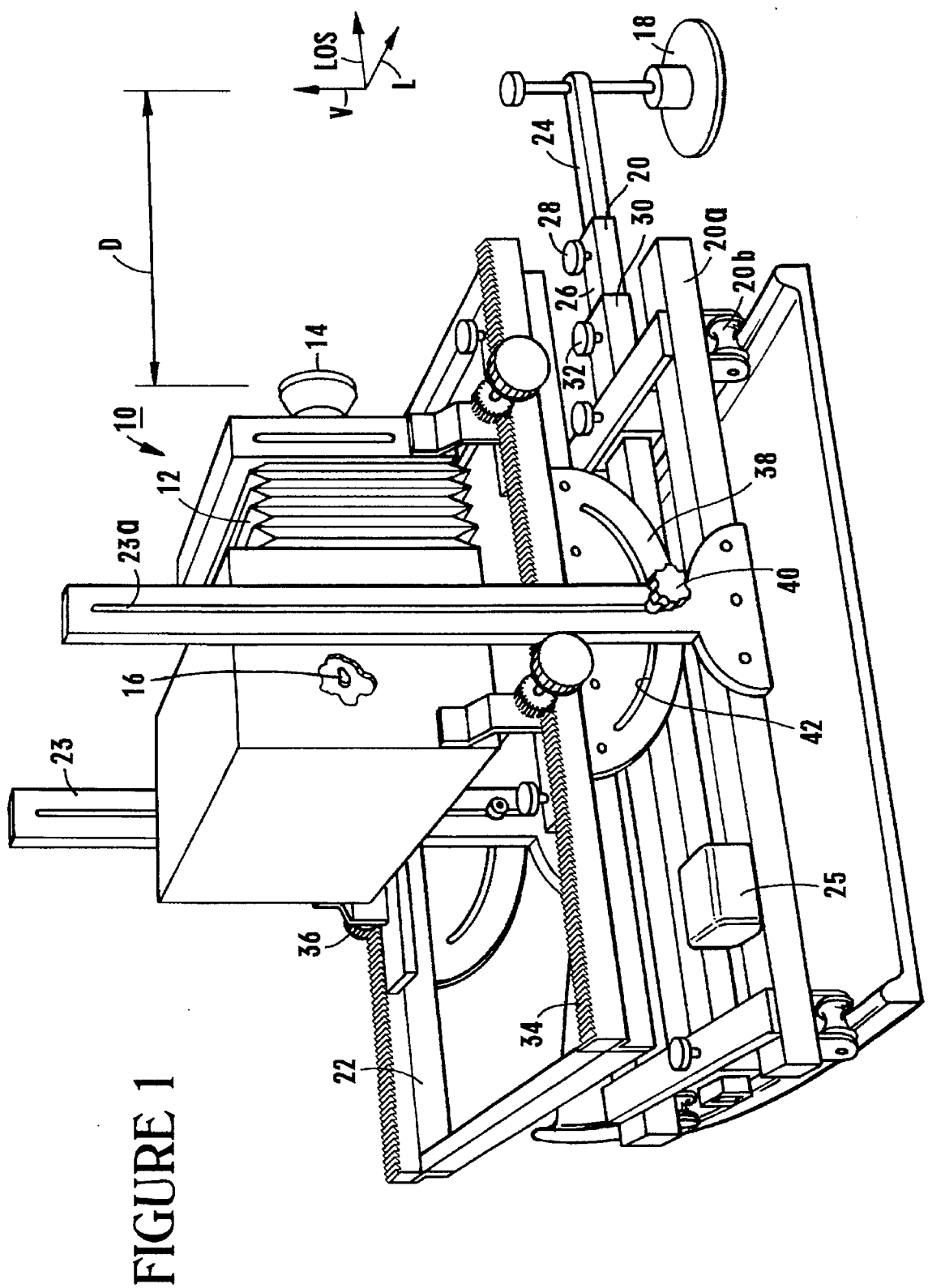
FIG. 1 is a perspective view of the 3-D camera of the present invention, with portions broken away.

Referring initially to FIG. 1, a 3-D camera system is shown, generally designated 10. As shown, the system 10 includes a sheet film, large format camera 12 such as is made by Calumet, having a camera lens 14 and a shutter control switch 16. It is to be understood that by operating the shutter control switch 16, the shutter of the camera 12 can be opened and closed.

As shown in FIG. 1, the camera system 10 defines a line-of-sight dimension LOS, a lateral dimension L, and a vertical dimension V. A pivot base 18 is positioned forward of the camera lens 14, and an elongated telescoping pivot column 20 is pivotably connected to the pivot base 18. Further, the camera 12 is mounted on a camera base 22, and the camera base 22 is connected to the pivot column 20 via vertical mounts 23.

Accordingly, the camera base 22 can be caused to move in an arc generally in the lateral dimension L, with the pivot base 18 establishing the center of the arc. To move the camera at a predetermined rate, a geared constant speed electric motor 25 is mounted on a wheeled shaft base 20a of the pivot shaft 20, with the motor being coupled to an external mass for pulling the pivot shaft toward the mass. Alternatively, the motor 25 can be coupled to wheels 20b of the shaft base 20a to drive the wheels 20b.

It will be appreciated that because the pivot shaft 20 telescopes, the distance D in the LOS dimension between the camera lens 14 and the pivot base 18 can be selectively established and varied as desired. More particularly, a first column segment 24 of the pivot column 20 can be reciprocated within a second column segment 26 to establish the distance D. A locking bolt 28 is threadably engaged with the second column segment 26, and the locking bolt 26 can be manipulated to abut the first segment 24 and thereby prevent relative motion between the segments 24, 26. If desired, additional segments 30 and locking bolts 32 can be provided.

As additionally shown in FIG. 1, the camera base 22 can include a track 34 that is elongated in the LOS dimension. Wheel gears 36 can be rotatably coupled to the camera 12 and engaged with the track 34 to facilitate moving the camera 12 in the LOS dimension.

Moreover, the height of the camera 12 (i.e., its position in the vertical dimension V) can be selectively established. More particularly, the vertical mounts 23 are formed with respective slots 23a, and the camera base 22 includes a tilt bracket 38 which is slidably engaged with the vertical mounts 23 by means of opposed vertical locking bolts 40 with associated nuts (not shown). Accordingly, the height of the camera base 22 can be established as desired, and the vertical locking bolts 40 then tightly engaged with their respective nuts to clamp the tilt bracket 38 against the respective vertical mounts 23 and thereby hold the camera 22 at the desired height.

Further, the tilt bracket 38 is formed with an arcuate slot 42. It will readily be appreciated in reference to FIG. 1 that the vertical locking bolts 40 can be loosened and the camera base 22 tilted relative to the horizontal plane as appropriate for the desired angle of the camera 12. Then, the locking bolts 40 can be tightened relative to their respective nuts to hold the camera base 22 in the desired orientation.

Figure 2:
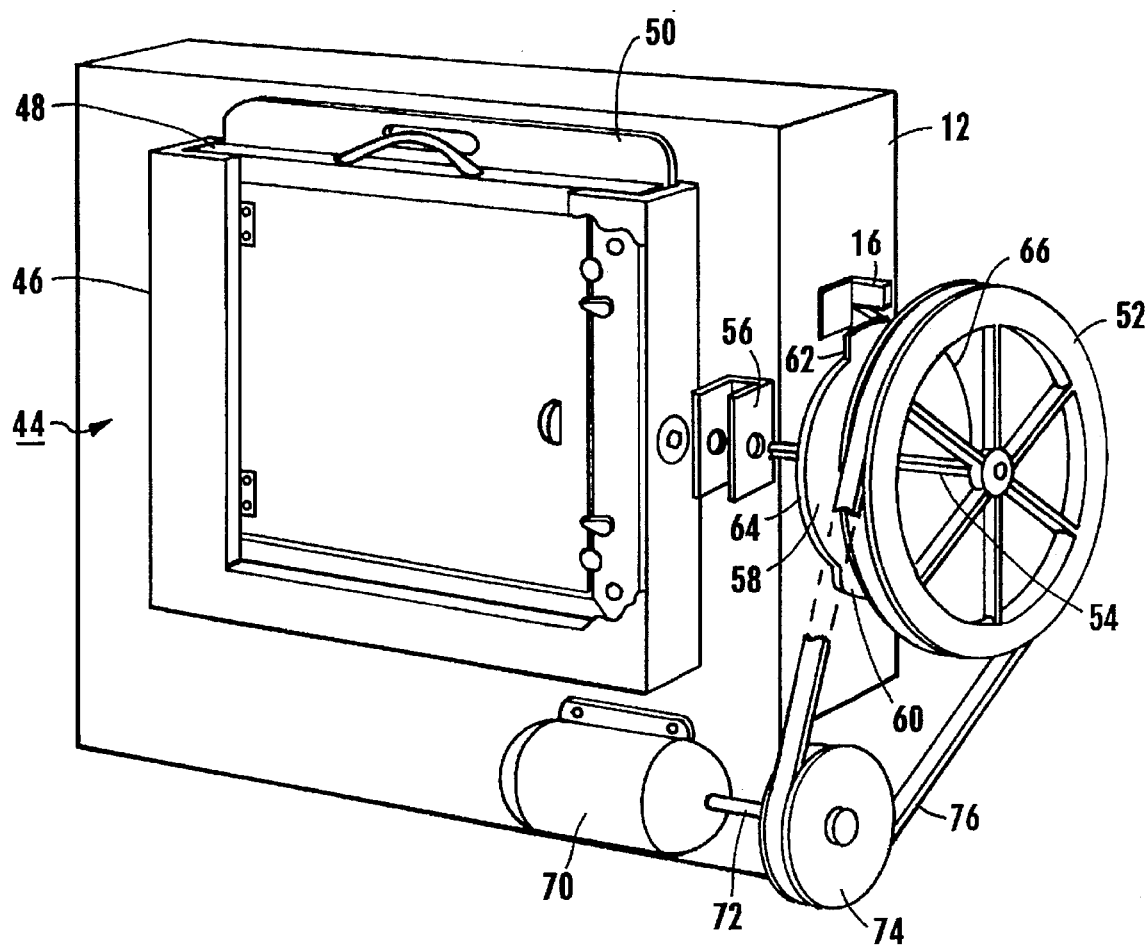
FIG. 2 is an exploded perspective view of the film carrier of the present invention, with portions broken away.
Figure 3:
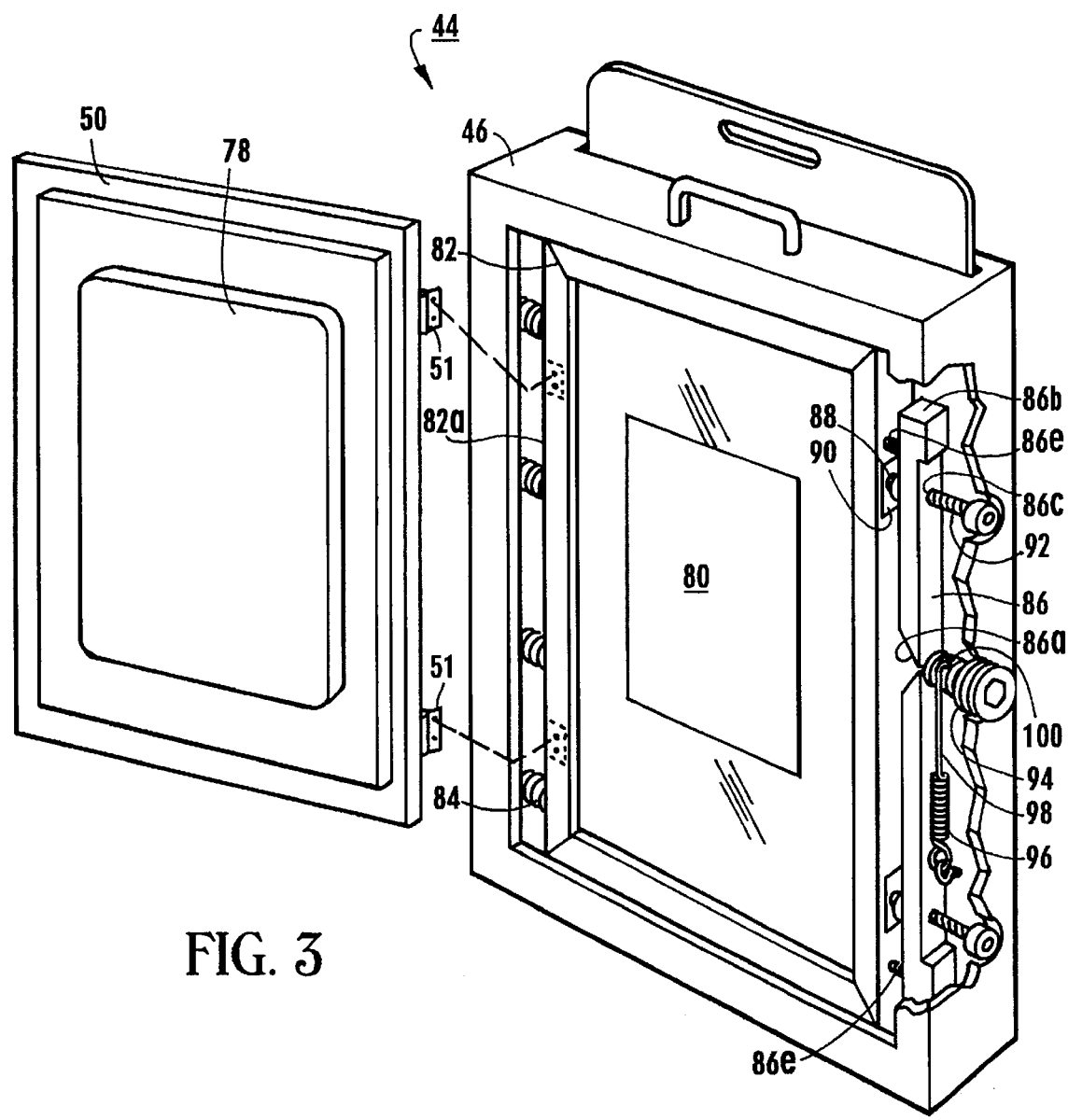
FIG. 3 is a perspective view of the film carrier, with portions cut away.

Now referring to FIGS. 2 and 3, a film carrier, generally designated 44, is attached to the back side (i.e., the side opposite the camera lens 14) of the camera 12. As shown, the film carrier 44 includes a frame 46 having an open edge 48 that is open to receive a film holder 50. As more fully disclosed below, the film holder 50 is coupled to the frame 46 for juxtaposing 4×5, 8×10, or 11×14 film with the camera lens 14 (FIG. 1). Although the open edge 48 is shown to be the top side of the frame 46, it is to be understood that the open edge of the present frame can be a side edge.

The details of the film carrier 44 are discussed in greater detail below in reference to FIG. 3. With continued reference to FIG. 2, however, in addition to the novel structure and advantages of the film holder 44 discussed below, a shutter flywheel 52 is provided for automatically operating the shutter switch 16 in conjunction with the advantageous operation of the film holder 44.

Now addressing the details of the shutter flywheel 52, as shown in FIG. 2 the shutter flywheel 52 is connected to a drive shaft 54, and the drive shaft 54 is rotatably engaged with components within the film carrier 44 described below. A drive shaft bracket 56 is attached to the camera 12 to radially support the drive shaft 54.

Also mounted on the drive shaft 54 between the drive shaft bracket 56 and the drive shaft 52 and rotatable therewith is a camming plate 58. As shown in FIG. 2, the camming plate 58 includes a shutter open cam surface 60 and a shutter close cam surface 62, both of which protrude radially beyond the inner periphery 64 of the camming plate 58 for defining a hold surface 66. It is to be understood that the shutter open cam surface 60 is configured and positioned on the camming plate 58 to ensure proper camera shutter operation for lenticular lenses having seventy five (75) lines per inch, eighty one (81) lines per inch, one hundred twenty (120) lines per inch, or other spacing.

Alternatively, the cam surfaces 60, 62 can be replaced by triggers (not shown) that are held by locking screws (not shown) onto a disc-shaped camming plate. In such an embodiment, the positions of the triggers on the camming plate can be adjusted by appropriately manipulating the locking screws.

As the camming plate 58 turns, the shutter switch 16 rides on the shutter open cam surface 60 to the open position of the shutter. The hold surface 66 remains in contact with the switch 16 to hold it open until the shutter close cam surface 62 is juxtaposed with the switch 16. The switch 16 then rides down the shutter close cam surface 62 to the inner periphery 64 of the camming plate 58, closing the shutter of the camera 12.

Per the present invention, the diameters of the camming plate 58 and shutter flywheel 52 are preferably at least six inches (6"), and more preferably at least twelve inches (12"). With this combination of structure, precisely establishing the positions of the camming surfaces 60, 62 relative to each other is facilitated, vis-a-vis a smaller diameter trigger plate (not shown). Thereby, precise opening and closing of the camera shutter is facilitated, to promote the cooperation of structure further described below in producing high-quality 3-D photographs.

An electric or stepping flywheel motor 70 is coupled to the shutter flywheel 52 for turning the shutter flywheel 52 to open and close the shutter of the camera 12. Specifically, the flywheel motor 70 is connected to a pulley shaft 72, and the pulley shaft 72 is in turn connected to a pulley 74. The pulley 74 is engaged with a flywheel belt 76, with the flywheel belt 76 also engaging the shutter flywheel 52. With this structure, the flywheel motor 72 can be energized to turn the shutter flywheel 52 with drive shaft 54. It is to be understood that the flywheel motor 70 can include gears (not shown) for establishing the rotational speed of the pulley 74 as appropriate for the lenticular lens used and the related camera 12 shutter speed.

Now referring to FIG. 3, the details of the film carrier 44 can be seen. As shown, a rubber pad 78 is glued to the film holder 50. Per the present invention, the film holder 50 is a wood or metal substrate that is engaged with the frame 46, such that the film holder 50 can be stationarily held by the frame 46. As but one example of how the film holder 50 can be engaged with the frame 46, the film holder 50 is hingedly connected to the frame 46 as shown via hinges 51.

Those skilled in the art will recognize that being made of rubber, the pad 78 is characterized by a relatively high coefficient of friction. With this combination of structure, it will be appreciated that film can be positioned against the pad 78 to thereby inhibit relative motion between the film and film holder 50.

A lenticular lens 80 is juxtaposed with the film holder 50. It is to be understood that the lenticular lens 80 is positioned between the film holder 50 and the camera lens 14, such that light propagating through the camera lens 14 passes through the lenticular lens 80 prior to impinging on the film that is held by the film holder 50. Preferably, the lenticular lens 80 is a conventional photographic lenticular lens having a grating spacing of, e.g., seventy five (75) lines per inch, eighty one (81) lines per inch, one hundred twenty (120) lines per inch, or other spacing.

In accordance with the present invention, the lenticular lens 80 is held by a wooden or plastic frame-like lens carrier 82. More specifically, the lenticular lens 80 is stationarily coupled to the lens carrier 82 by gluing or otherwise affixing the lenticular lens 80 to the lens carrier 82. As intended by the present invention, the lens carrier 82 is movably coupled to the frame 46 of the film carrier 44 to selectively move the lenticular lens 80 relative to the film holder 50.

Importantly, as shown in FIG. 3 four or more (e.g., eight) coil springs 84 are disposed between the frame 46 and the lens carrier 82. The springs 84 are in compression between the frame 46 and a left vertical edge 82a of the lens carrier 82. Consequently, the springs 84 urge against the lens carrier 82 and thereby spring-load the lens carrier 82 toward the right of the page, looking down on FIG. 3. I have found that by using a plurality of springs 84 as shown, the lens carrier 82 is urged with a relatively constant force, and the force is distributed substantially evenly along the left vertical edge 82a of the lens carrier 82. Thereby, tilting of the lens carrier 82 is avoided.

Still referring to FIG. 3, two opposed rigid elongated metal or plastic paddles 86 are pivotably coupled to the frame 46 opposite the springs 84. As shown, each paddle 86 includes a bevelled inner end 86a and an outer end 86b. As further shown, each paddle 86 is pivotably coupled to the frame 46 at a respective pivot point 86c, with the pivot point 86c being closer to the outer end 86b than the inner end 86a. In the preferred embodiment shown, a respective coil paddle spring 86e is positioned between the pivot point 86c and outer end 86b of each paddle 86, and is sandwiched in compression the paddle 86 and the frame 46.

Furthermore, each paddle 86 includes a respective contact surface 88 for abutting a respective steel pressure plate 90 that is glued or otherwise affixed to the lens carrier 82. In the presently preferred embodiment, each contact surface 88 is established by a respective contact element 92, and each contact element 92 is movably engaged with a respective paddle 86 for adjustment of the contact element 92 relative to the respective paddle 86. Hence, by adjusting the contact elements 92, the distance between the lens carrier 82 and paddles 86, as well as the angular orientation (i.e., tilt) of the lens carrier 82 relative to the frame 46, can be selectively established. Preferably, each contact element 92 is a bolt that is threadably engaged with a respective paddle 86.

A drive bolt 94 is threadably engaged with the frame 46. It is to be understood that the drive bolt 94 is coupled to the drive shaft 54 (FIG. 2), such that when the motor 70 is energized, the drive bolt 94 turns in the counterclockwise direction (and, thus, moves translationally outwardly, i.e., toward the right of the page, looking down on FIG. 3). As shown in FIG. 3, the drive bolt 94 abuts the inner ends 86a of both paddles 86. Preferably, the threads of the drive bolt are finely machined to facilitate smooth turning of the bolt 94, with the throw of the threads being relatively short.

Moreover, the drive bolt 94 is biased toward a neutral position. More particularly, a biasing spring 96 is attached to the frame 46, and a spring wire 98 interconnects the biasing spring 96 and drive bolt 94. To receive the spring wire 98, a hole 100 is drilled in to the shaft of the drive bolt 94 as shown. When the drive bolt 94 is in the neutral position, the biasing spring 96 is at rest. In contrast, when the drive bolt 94 has been rotated by the motor 70, the spring wire 98 is wound around the shaft of the drive bolt 94, thereby tensioning the biasing spring 96.

Accordingly, when the motor 70 releases the drive bolt 94, the drive bolt 94 automatically returns to the neutral position established by the biasing spring 96. Hence, because of the cooperation of structure between the drive bolt 94 and paddles 86, the lens carrier 82 is returned to the same position vis-a-vis the frame 46 at the end of each photographic operation.

With the above-described cooperation of structure, the operation of the film carrier 44 can now be appreciated. The motor 70 is energized, turning both the shutter flywheel 52 (FIG. 2) to operate the shutter of the camera 12 and the drive bolt 94 (FIG. 3).

Simultaneously, the drive screw 94 is turned counterclockwise. This causes the lens carrier 82 to move under the influence of the springs 84, pushing the paddies 86 to cause them to pivot about their pivot points 86c. In other words, the lens carrier 82 with lenticular lens 80 is released to move evenly, at a constant speed and with an orientation that is constantly parallel to the vertical edge 82a of the frame 46, past the film in the film holder 50. It is to be understood that the gearing of the motor 70, and the configuration of the camming plate 58 and shutter flywheel 52, are established as appropriate to open the shutter of the camera 12, move the lenticular lens 80 one grating space (e.g., $\frac{1}{81}$"), and immediately close the shutter.

It is to be further appreciated that with the structure described above, the present invention achieves the above-stated movements with a high degree of precision and repeatability, compared to existing 3-D photographic systems. For example, the lens carrier 82 is essentially released by the motor 70 instead of being directly pushed by the motor 70, thereby facilitating smooth, even, controlled motion of the lens carrier 82. Further, because the drive bolt 94 is spring-biased to the neutral position, the lens carrier 82 is returned to the same starting position after every photograph.

Figure 4C:
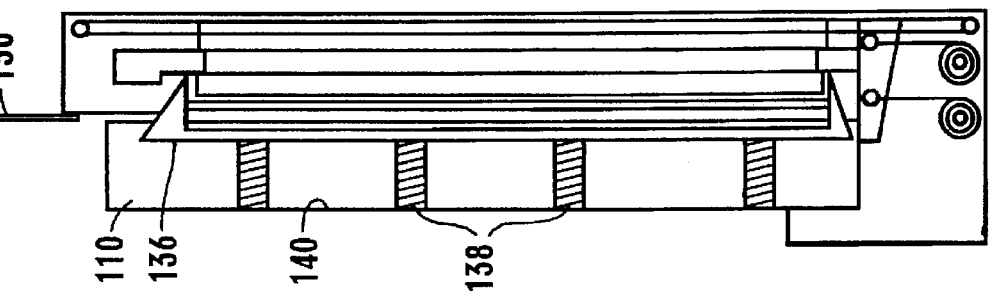
FIG. 4C is a side view of the embodiment shown in FIG. 4A, showing the film holder engaged with the frame and the dark slide raised.
Figure 4B:
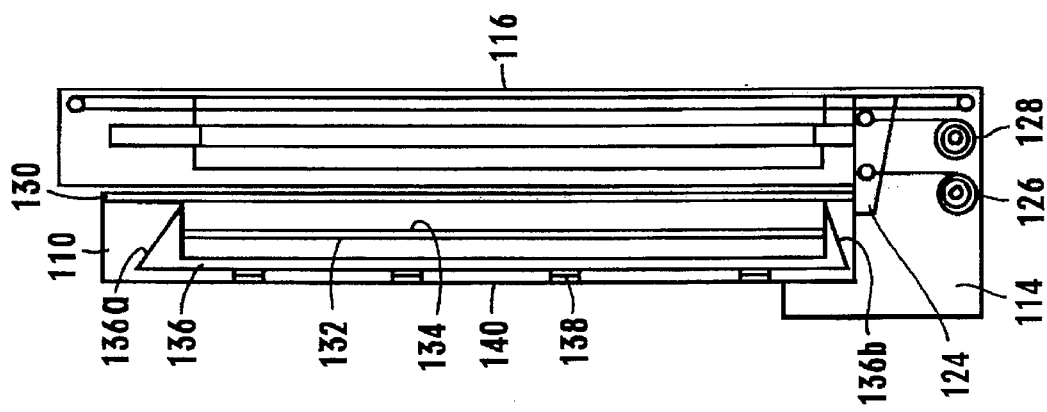
FIG. 4B is a side view of the embodiment shown in FIG. 4A, showing the film holder engaged with the frame and the dark slide lowered.
Figure 4A:
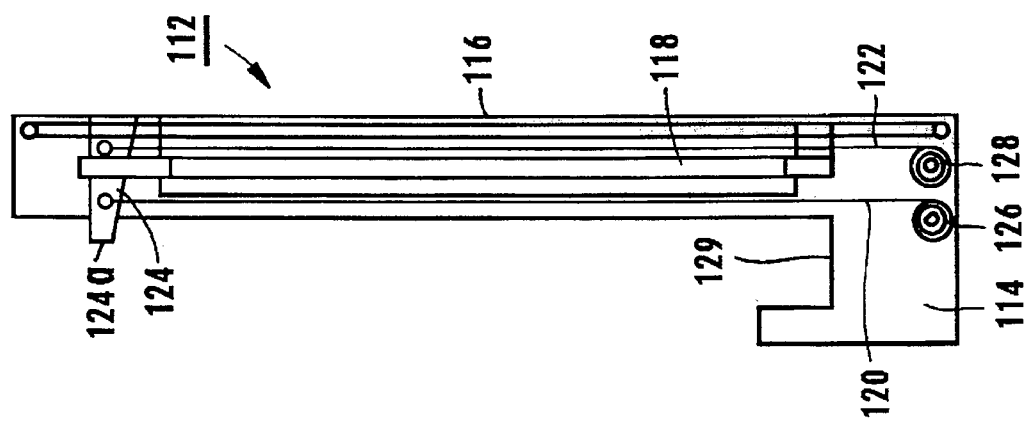
FIG. 4A is a side view of an alternate embodiment of the film carrier of the present invention, showing the film holder removed from the frame.

FIGS. 4A-4C show that in an alternate embodiment, a film holder 110 of a film carrier, generally designated 112, can be slidably engaged with a frame 114 which holds a lens carrier 116. It is to be understood that the lens carrier 116 shown in FIGS. 4A-4C is in all substantial respects identical in construction and operation to the lens carrier 82 shown in FIG. 3, with the exceptions noted below. It is to be appreciated in reference to FIGS. 4B and 4C that the film holder 110 can be manually advanced into juxtaposition with the lens carrier 116. Further, it is to be appreciated that the film holder 110 can be manually retracted from the frame 114.

As shown in FIG. 4A, a lenticular lens 118 is sandwiched between two protective diaphragms 120, 122 in the lens carrier 116. An angle bracket 124 is slidably engaged with the lens carrier 116, and the angle bracket 124 is attached to the diaphragms 120, 122. As shown, a portion 124a of the angle bracket 124 protrudes outwardly beyond the lens carrier 116. Further, each diaphragm 120, 122 is attached to a respective spring-loaded take-up reel 126, 128. Per the present invention, the angle bracket 124 is spring loaded toward the position shown in FIG. 4A.

In cross-reference to FIGS. 4A and 4B, the film carrier 110 is advanced toward a carrier trough 129 in the frame 114 from the top of the frame 114, looking down on FIG. 4A. As the film holder 110 is slid into the trough 129, the film carrier 110 abuts the protruding portion 124a of the angle bracket 124 to urge the angle bracket toward the position shown in FIG. 4B, i.e., toward the bottom of the frame 114, looking down on FIG. 4B. It will readily be appreciated that this causes the diaphragms 120, 122 to wind around their respective take-up reels 126, 128, thereby exposing the lenticular lens 118.

The film holder 110 includes a dark slide 130 that faces a foam rubber pad 132 against which film 134 is positioned. Further, the film holder 110 includes a support plate 136. As shown, the support plate 136 is formed with opposed bevelled ends 136a, 136b which contact the dark slide 130. Four plate springs 138 are sandwiched in compression between a wall 140 of the film holder 110 and the support plate 136 to urge the support plate 136 against the dark slide 132.

With the above-described cooperation of structure, the film holder 110 is advanced into the position shown in FIG. 4B, with the dark slide 130 separating the film 134 from the lenticular lens 118. Then, a person can grasp the dark slide 130 and pull it upwardly to the position shown in FIG. 4C. As the dark slide is pulled upwardly out of contact with the bevelled ends 136a, 136b of the support plate 136, the springs 138 urge the support plate 136 to the position shown in FIG. 4C, wherein the film 134 is closely juxtaposed with the lenticular lens 118. It is to be consequently understood that the film 134 is automatically and accurately juxtaposed with the lenticular lens 118 when the dark slide 130 is lifted, thus simplifying the operation of the film carrier 112.

The operation of the film carrier 112 shown in FIGS. 4A-4C in conjunction with a camera is essentially identical to the operation of the film carrier 44 shown in FIG. 3 in exposing the film. After exposure, the dark slide 130 is moved back to the position shown in FIG. 4B. It will readily be appreciated that owing to the bevel of the end 136a of the support plate 136, as the dark slide 130 is moved downwardly it rides against the end 136a, urging the support plate 136 back to the position shown in FIG. 4B. Thereby, the film 134 is advantageously gently distanced from the lenticular lens 118, thus avoiding damage to the film 134 and lens 118.

Next, the film holder 110 is lifted out of the trough 129 of the frame 114. The angle bracket 124 consequently returns to the position shown in FIG. 4A, thereby lifting the protective diaphragms 120, 122 and thus shielding the lenticular lens 118 to protect it. The film 134 can be removed from the film holder 110 and replaced by a new film, and the above procedure repeated.

Figure 5:
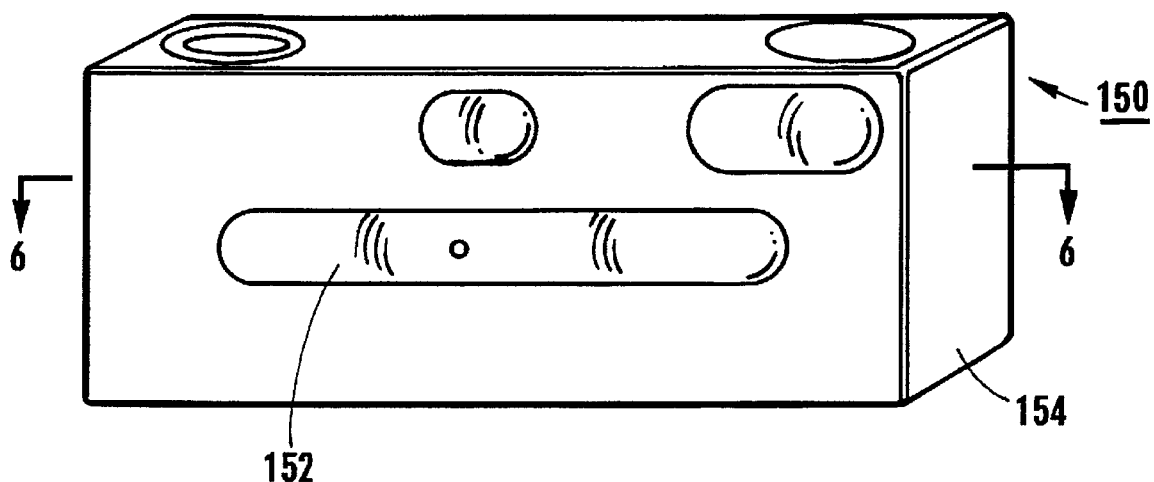
FIG. 5 is a perspective view of still another embodiment of the camera of the present invention.
Figure 6:
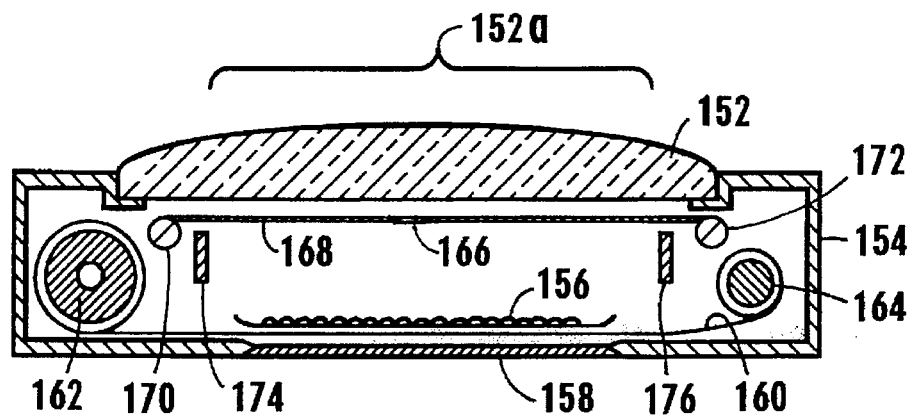
FIG. 6 is a cross-sectional view, as seen along the line 6—6 in FIG. 5, showing the aperture element in a first position in solid and showing the aperture element in a second position in phantom.

FIGS. 5 and 6 show yet another embodiment of the camera of the present invention, generally designated 150. As shown best in FIG. 6, a camera lens 152 is positioned in a hollow, preferably plastic, portable housing 154. As shown, the camera lens 152 is oval-shaped, and defines an elongated prime lens area 152a.

A lenticular lens 156 is stationarily positioned in the housing 154. Also, a foam rubber pad 158 is juxtaposed with the lenticular lens 156, and film 160 can be sandwiched between the lenticular lens 156 and the pad 158. The pad 158 is characterized by a relatively high coefficient of friction for contacting the film 160 and inhibiting relative motion therebetween.

As shown in FIG. 6, the film 160 is engaged with opposed take-up reels 162, 164 in accordance with principles well known in the art. One or both of the take-up reels 162, 164 can be spring loaded.

An aperture 166 is formed in an opaque, flexible, preferably thin steel aperture element 168. The aperture element 168 is translationally movable in the housing 154 and, as shown, is disposed between the lenses 152, 156. FIG. 6 shows that the aperture element 168 is connected to and can be wound around left and right take-up wheels 170, 172, each of which is rotatably mounted in the housing 154. One or both of the wheels 170, 172 can include a tensioning brake (not shown) which is adjustable by well-known means to establish the speed of the aperture element 168.

Desirably, left and right opaque barriers 174, 176 are positioned in the housing 154. Consequently, light from the camera lens 152 can enter the housing 154 only between the barriers 174, 176. As a further consequence, only light from the prime lens area 152a enters the housing 154.

In the operation of the camera 150, a control (not shown) can be manipulated to cause the wheels 170, 172 to rotate. As the wheels 170, 172 rotate, the aperture 166 moves translationally across the housing 154. Light from the camera lens 152 can pass through the aperture 166, but not the aperture element 168. Consequently, the film 160 is exposed incrementally with an image having an apparently changing perspective. It is to be understood that while the embodiment shown in FIG. 6 contemplates motion of the aperture 166 in the horizontal dimension of the camera 150, the wheels 170, 172 can be positioned such that the aperture 166 moves in the vertical dimension of the camera 150.

While the particular 3-D camera as herein shown and disclosed in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A film carrier for a camera having a lens, comprising:
   a frame;
   an film holder coupled to the frame for juxtaposing film with the lens;
   a lenticular lens juxtaposed with the film holder between the film holder and the lens of the camera;
   a spring-loaded lens carrier stationarily coupled to the lenticular lens and movably coupled to the frame to selectively move the lenticular lens relative to the film holder;
   at least one spring disposed between the frame and the lens carrier to urge against the lens carrier and thereby spring-load the lens carrier; and
   at least one paddle pivotably coupled to the frame opposite the spring, the paddle including a contact surface for abutting the lens carrier, such that when the paddle is moved the spring urges the lens carrier to move, thereby moving the lenticular lens relative to the film holder.

2. The film carrier of claim 1, further comprising a drive bolt threadably engaged with the frame, the drive bolt abutting the paddle.

3. The film carrier of claim 2, further comprising a motor coupled to the drive bolt for turning the drive bolt to thereby cause the lens holder to move.

4. The film carrier of claim 3, further comprising a pad characterized by a relatively high coefficient of friction, the pad being attached to the film holder for contacting the film and inhibiting relative motion therebetween.

5. The film carrier of claim 2, further comprising a plurality of springs, wherein the at least one paddle is a first paddle, and the film carrier further includes a second paddle pivotably coupled to the frame opposite the springs, the second paddle including a contact surface for abutting the lens carrier, the drive bolt abutting the second paddle.

6. The film carrier of claim 5, wherein each contact surface is defined by a respective contact element, and each contact element is movably engaged with the respective paddle for adjustment thereof relative to the respective paddle.

7. The film carrier of claim 2, wherein the drive bolt is spring biased to a neutral position.

8. The film carrier of claim 3, further comprising a shutter flywheel coupled to the motor and a drive shaft coupling the shutter flywheel to the drive bolt, the shutter flywheel further including a shutter open trigger for opening a shutter of the camera, the shutter flywheel further including a shutter close trigger for closing the shutter.

9. The film carrier of claim 1, wherein the film holder is slidably engaged with the frame, such that the film holder can be manually advanced into juxtaposition with the lens carrier and such that the film holder can be manually retracted from the frame.

10. The film carrier of claim 9, further comprising:
    a dark slide slidably engaged with the frame;
    a support plate formed with opposed bevelled ends; and
    a plurality of plate springs sandwiched between the film holder and the support plate to urge the support plate against the dark slide, such that the dark slide can be advanced into the frame to distance the film holder from the lens carrier, and such that the dark slide can be retracted from the frame to cause the plate springs to move the film holder into juxtaposition with the lens carrier.

11. A film carrier for a 3-D camera system having a camera, comprising:
    a shutter flywheel including shutter open trigger for opening a shutter of the camera, the shutter flywheel further including a shutter close trigger for closing the shutter; and
    a motor coupled to the shutter flywheel for turning the shutter flywheel to open and close the shutter.

12. The film carrier of claim 11, wherein the shutter flywheel defines a diameter of at least six inches (6") to facilitate precisely spacing the shutter close trigger a predetermined distance from the shutter open trigger.

13. The film carrier of claim 11, further comprising;
    a frame;
    a film holder coupled to the frame for juxtaposing film with a lens of the camera;
    a lenticular lens juxtaposed with the film holder between the film holder and the lens of the camera;
    a lens carrier stationarily coupled to the lenticular lens and movably coupled to the frame to selectively move the lenticular lens past the film holder;
    at least one spring disposed between the frame and the lens carrier to urge against the lens carrier; and
    at least one paddle pivotably coupled to the frame opposite the spring, the paddle including a contact surface for abutting the lens carrier, such that when the paddle is moved the spring urges the lens carrier to move, thereby moving the lenticular lens past the film holder.

14. The film carrier of claim 13, further comprising:
    a drive bolt threadably engaged with the frame in an abutting relationship with the paddle;
    a drive shaft coupled to the shutter flywheel and to the drive bolt for turning the drive bolt.

15. The film carrier of claim 14, further comprising a pad characterized by a relatively high coefficient of friction, the pad being attached to the film holder for contacting the film and inhibiting relative motion therebetween.

16. The film carrier of claim 15, further comprising a plurality of springs, wherein the at least one paddle is a first paddle, and the film carrier further includes a second paddle pivotably coupled to the frame opposite the springs, the second paddle including a contact surface for abutting the lens carrier, the drive bolt abutting the second paddle.

17. The film carrier of claim 16, wherein each contact surface is defined by a respective contact element, and each contact element is movably engaged with the respective paddle for adjustment thereof relative to the respective paddle.

18. The film carrier of claim 17, wherein the drive bolt is spring biased to a neutral position.

19. A portable 3-D camera, comprising:

a housing;

a camera lens positioned on the housing;

a lenticular lens positioned on the housing;

an aperture translationally movable in the housing, the aperture being disposed between the lenses; and a pad characterized by a relatively high coefficient of friction, the pad being disposed on the side of the lenticular lens opposite the camera lens for contacting film and inhibiting relative motion therebetween.

20. The camera of claim 19, wherein the camera defines a horizontal dimension and a vertical dimension, and the aperture moves in at least one of the dimensions.

21. The camera of claim 20, further comprising an aperture element defining the aperture, the aperture element being connected to left and right take-up wheels.

22. The camera of claim 19, wherein the camera lens is oval-shaped and defines an elongated prime lens area.

23. A 3-D camera, comprising:

a camera lens;

a film holder positioned behind the camera lens;

a lenticular lens positioned between the camera lens and the film holder for translational movement of the lenticular lens relative to the film holder;

a spring positioned to urge the lens to move relative to the film; and a paddle positioned on the side of the lens opposite the spring such that when the paddle is moved the spring urges the lens to move.

24. The camera of claim 23, further comprising:

a frame, the film holder being coupled to the frame for juxtaposing film with the camera lens; and a lens carrier stationarily coupled to the lenticular lens and movably coupled to the frame to selectively move the lenticular lens relative to the film holder, the lens carrier abutting the spring and the paddle.

25. The camera of claim 24, further comprising a drive bolt threadably engaged with the frame, the drive bolt abutting the paddle.

26. The camera of claim 25, further comprising a motor coupled to the drive bolt for turning the drive bolt to thereby cause the lens carrier to move.

27. The camera of claim 26, further comprising a pad characterized by a relatively high coefficient of friction, the pad being attached to the film holder for contacting the film and inhibiting relative motion therebetween.

28. The camera of claim 27, further comprising a plurality of springs, wherein the at least one paddle is a first paddle, and the camera further includes a second paddle pivotably coupled to the frame opposite the springs, the second paddle including a contact surface for abutting the lens carrier, the drive bolt abutting the second paddle.

29. The camera of claim 28, wherein each contact surface is defined by a respective contact element, and each contact element is movably engaged with the respective paddle for adjustment thereof relative to the respective paddle.

30. The camera of claim 29, wherein the drive bolt is spring biased to a neutral position.

31. The camera of claim 30, further comprising a shutter flywheel coupled to the motor and a drive shaft coupling the shutter flywheel to the drive bolt, the shutter flywheel further including a shutter open trigger for opening a shutter of the camera, the shutter flywheel further including a shutter close trigger for closing the shutter.

32. The camera of claim 31, wherein the film holder is slidably engaged with the frame, such that the film holder can be manually advanced into juxtaposition with the lens carrier and such that the film holder can be manually retracted from the frame.

33. The film carrier of claim 32, further comprising:

a dark slide slidably engaged with the frame;

a support plate formed with opposed bevelled ends; and a plurality of plate springs sandwiched between the film holder and the support plate to urge the support plate against the dark slide, such that the dark slide can be advanced into the frame to distance the film holder from the lens carrier, and such that the dark slide can be retracted from the frame to cause the plate springs to move the film holder into juxtaposition with the lens carrier.

34. A 3-D camera system, comprising:

a camera; and a motor-driven shutter flywheel including a shutter open trigger for opening a shutter of the camera, the shutter flywheel further including a shutter close trigger for closing the shutter, the shutter flywheel defining a diameter of at least eight inches (8").

35. The 3-D camera system of claim 34, further comprising a motor coupled to the shutter flywheel for turning the shutter flywheel to open and close the shutter.

36. The 3-D camera system of claim 35, further comprising;

a frame;

a film holder coupled to the frame for juxtaposing film with a lens of the camera;

a lenticular lens juxtaposed with the film holder between the film holder and the lens of the camera;

a lens carrier stationarily coupled to the lenticular lens and movably coupled to the frame to selectively move the lenticular lens past the film holder;

at least one spring disposed between the frame and the lens carrier to urge against the lens carrier; and at least one paddle pivotably coupled to the frame opposite the spring, the paddle including a contact surface for abutting the lens carrier, such that when the paddle is moved the spring urges the lens carrier to move, thereby moving the lenticular lens past the film holder.

37. The 3-D camera system of claim 36, further comprising:

a drive bolt threadably engaged with the frame in an abutting relationship with the paddle;

a drive shaft coupled to the shutter flywheel and to the drive bolt for turning the drive bolt.

38. The 3-D camera system of claim 37, further comprising a pad characterized by a relatively high coefficient of friction, the pad being attached to the film holder for contacting the film and inhibiting relative motion therebetween.

39. The 3-D camera system of claim 38, further comprising a plurality of springs, wherein the at least one paddle is a first paddle, and the 3-D camera system further includes a second paddle pivotably coupled to the frame opposite the springs, the second paddle including a contact surface for abutting the lens carrier, the drive bolt abutting the second paddle.

40. The 3-D camera system of claim 39, wherein each contact surface is defined by a respective contact element, and each contact element is movably engaged with the respective paddle for adjustment thereof relative to the respective paddle.

41. The 3-D camera system of claim 40, wherein the drive bolt is spring biased to a neutral position.

42. A portable 3-D camera, comprising:

a housing;

a camera lens positioned on the housing;

a lenticular lens positioned on the housing;

a light path element for establishing a movable light path between the lenses; and a pad characterized by a relatively high coefficient of friction, the pad being disposed on the side of the lenticular lens opposite the camera lens for contacting film and inhibiting relative motion therebetween.

43. The camera of claim 42, wherein the camera defines a horizontal dimension and a vertical dimension, the light path element is formed with an aperture, and the aperture moves in at least one of the dimensions.

44. The camera of claim 43, wherein the light path element is connected to left and right take-up wheels.

45. The camera of claim 42, wherein the camera lens is oval-shaped and defines an elongated prime lens area.

46. A photographic method, comprising the steps of:

positioning a lenticular lens between a camera lens and a camera film;

spring biasing the lenticular lens toward an end position;

holding the lenticular lens in a start position by means of a release mechanism including a paddle movably engaged with the frame; and releasing the lenticular lens to permit the lens to move at a predetermined speed relative to the film.

47. A photographic method, comprising the steps of:

positioning a movable aperture between a camera lens and a lenticular lens;

moving the aperture relative to the lenses; and disposing a pad characterized by a relatively high coefficient of friction on the side of the lenticular lens opposite the camera lens for contacting film and inhibiting relative motion therebetween.

* * * * *